United States Patent
Chen et al.

(10) Patent No.: US 10,794,682 B2
(45) Date of Patent: Oct. 6, 2020

(54) BALL SCREW WITH TILT DETECTOR

(71) Applicant: Industrial Technology Research Institute, Hsinchu (TW)

(72) Inventors: Chih-Yuan Chen, Taipei (TW); Chung-Yuan Su, Tainan (TW); Chih-Che Lin, Tainan (TW); Chao-Ta Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 16/136,277

(22) Filed: Sep. 20, 2018

(65) Prior Publication Data

US 2019/0204064 A1 Jul. 4, 2019

(30) Foreign Application Priority Data

Dec. 29, 2017 (TW) .............................. 106146354 A

(51) Int. Cl.
*G01B 7/31* (2006.01)
*F16H 25/22* (2006.01)
(Continued)

(52) U.S. Cl.
CPC .......... *G01B 7/31* (2013.01); *F16H 25/2209* (2013.01); *G01B 21/22* (2013.01); *G01B 21/32* (2013.01)

(58) Field of Classification Search
CPC .......... G01B 7/31; G01B 21/22; G01B 21/32; F16H 25/2209
See application file for complete search history.

(56) References Cited

U.S. PATENT DOCUMENTS 3,124,969 A * 3/1964 Grabowski et al. ........................ F16H 25/2209
74/441
3,720,116 A * 3/1973 Better ................. F16H 25/2209
74/89.42
(Continued)

FOREIGN PATENT DOCUMENTS

CN 104551867 4/2015
CN 205383234 7/2016
(Continued)

OTHER PUBLICATIONS

Mohring; Hans-Christian et al. "Integrated autonomous monitoring of ball screw drives," CIRP Annals—Manufacturing Technology, CIRP Annals, vol. 61, Issue 1, Apr. 25, 2012, pp. 355-358.
(Continued)

*Primary Examiner* — Zakaria Elahmadi
(74) *Attorney, Agent, or Firm* — JCIPRNET

(57) ABSTRACT

A ball screw with tilt detector includes a screw rod, two screw nuts, a channel, a plurality of balls, and a tilt detector. The screw rod is extended along a direction of an axis. The two screw nuts are installed on the screw rod and capable of moving along the axis. The tilt detector is disposed between the two screw nuts to detect a tilt angle and a preload of the two screw nuts. The tilt detector includes a force receiving element, at least one first strain sensor, and at least one second strain sensor. The force receiving element includes a point symmetric ring-type structure, and the ring-type structure has two planes which are parallel to each other and respectively contact the two screw nuts.

30 Claims, 9 Drawing Sheets

(51) Int. Cl.
 *G01B 21/32* (2006.01)
 *G01B 21/22* (2006.01)

(56) References Cited

U.S. PATENT DOCUMENTS

| | | | | |
|---|---|---|---|---|
| 5,501,118 | A * | 3/1996 | Benton | F16H 25/2209 470/2 |
| 6,038,933 | A | 3/2000 | Meyer | |
| 6,508,592 | B1 * | 1/2003 | Perni | F16C 19/522 384/1 |
| 6,677,539 | B2 | 1/2004 | Miura et al. | |
| 6,684,949 | B1 | 2/2004 | Gabler et al. | |
| 6,792,815 | B2 | 9/2004 | McDearmon et al. | |
| 7,562,596 | B2 * | 7/2009 | Chen | F16H 25/2209 74/89.42 |
| 7,870,796 | B2 | 1/2011 | Hayakawa et al. | |
| 8,082,642 | B1 * | 12/2011 | McCulloch | B23C 1/12 29/26 A |
| 8,904,883 | B2 | 12/2014 | Clegg et al. | |
| 9,145,958 | B2 | 9/2015 | Jeng et al. | |
| 9,279,487 | B1 * | 3/2016 | Guglietti | F16H 25/2214 |
| 9,765,866 | B2 * | 9/2017 | Samsfort | F16H 25/2006 |
| 2002/0148672 | A1 * | 10/2002 | Tatewaki | B62D 5/0424 180/443 |
| 2006/0019558 | A1 * | 1/2006 | Mizutani | B63H 20/12 440/59 |
| 2006/0169079 | A1 * | 8/2006 | Lee | F16H 25/2233 74/424.82 |
| 2007/0068291 | A1 * | 3/2007 | Beatty | H02K 7/06 74/89.26 |
| 2010/0132494 | A1 * | 6/2010 | Sugita | F16H 25/2214 74/424.87 |
| 2010/0247262 | A1 * | 9/2010 | Sakane | B23Q 1/52 409/137 |
| 2011/0096808 | A1 * | 4/2011 | Hwang | F16H 25/2021 374/141 |
| 2013/0249464 | A1 * | 9/2013 | Knox | B60G 17/0157 318/625 |
| 2014/0120193 | A1 * | 5/2014 | Maruyama | B29C 45/1751 425/150 |
| 2014/0157927 | A1 * | 6/2014 | Shindo | F16H 57/0497 74/424.81 |
| 2014/0165759 | A1 * | 6/2014 | Jeng | F16H 25/2006 74/424.81 |
| 2014/0190291 | A1 * | 7/2014 | Medina | F16H 25/205 74/89.23 |
| 2015/0377719 | A1 * | 12/2015 | Tsai | G01K 3/10 374/107 |
| 2016/0334288 | A1 | 11/2016 | Berme et al. | |
| 2017/0159778 | A1 * | 6/2017 | Jeng | F16H 25/2214 |
| 2018/0045291 | A1 * | 2/2018 | Teyssier | F16D 9/06 |
| 2019/0101195 | A1 * | 4/2019 | Kwasniewski | F16H 25/2204 |

FOREIGN PATENT DOCUMENTS

| | | |
|---|---|---|
| JP | 2014159847 | 9/2014 |
| TW | M430540 | 6/2012 |
| TW | I513927 | 12/2015 |
| TW | I529324 | 4/2016 |
| TW | I544164 | 8/2016 |
| TW | M540214 | 4/2017 |
| WO | 2017065487 | 4/2017 |

OTHER PUBLICATIONS

S. Biehl et al. "Thin Film Sensors for Condition Monitoring in Ball Screw Drives," 1st Joint International Symposium on System-Integrated Intelligence, Jan. 2012, pp. 59-61.

A. Oyangguren et al. "Preload variation due to temperature increase in double nut ball screws," Production Engineering Research and Development, vol. 10, Issue 4-5, Aug. 26, 2016, pp. 529-537.

"Office Action of Taiwan Counterpart Application", dated Oct. 16, 2018, p. 1-p. 4.

* cited by examiner

BALL SCREW WITH TILT DETECTOR

CROSS-REFERENCE TO RELATED APPLICATION

This application claims the priority benefit of Taiwan application serial no. 106146354, filed on Dec. 29, 2017. The entirety of the above-mentioned patent application is hereby incorporated by reference herein and made a part of this specification.

TECHNICAL FIELD

The disclosure relates to a ball screw, and more particularly, to a ball screw with a tilt detector that may detect tilting angle and preload variation of screw nut.

BACKGROUND

The ball screw is a linear mechanical actuator in which a steel ball is installed between a screw nut and a screw rod. The rotational motion of the steel ball inside the screw nut is translated to linear motion of the screw nut. The ball screw has features such as high accuracy, long service life, and the capacity for high-speed forward transmission and reverse transmission.

For various precision machining processes of a hybrid processing machine, the real-time monitoring on signals of the ball screw such as preload magnitude and temperature variation becomes increasingly crucial. In the future technical development of smart ball screws, it has become a trend to instantly feedback these signals to the controller for subsequent accuracy control and troubleshooting.

Via a pressure sensor installed inside the screw nut, conventional ball screws sense the preload so as to determine the deviation in accuracy. However, conventional ball screws are only equipped with preload sensors for the screw nut and cannot estimate the preload variation with temperature compensation. Moreover, some of the conventional ball screws are only equipped with temperature sensors instead of reference strain sensors and cannot accurately estimate the magnitude of preload caused by temperature variation. In addition, after extended use of the ball screws, the contact surfaces between the screw nut and the sensor become non-parallel, thereby resulting in screw nut tilt. A tilted screw nut readily increases abrasion between the screw nut and the screw rod, thus affecting the service life and accuracy of the ball screw.

SUMMARY

The disclosure provides a ball screw that may detect tilting degree and preload variation of a screw nut, and allow the ball screw to operate without the screw nut tilting such that the ball screw is prevented from abrasion, thereby increasing the service life of the ball screw.

The ball screw of the disclosure includes a screw rod, two screw nuts, a channel, a plurality of balls, and a tilt detector. The screw rod has a first groove on an outer surface of the screw rod and is extended along a direction of an axis. Each of the two screw nuts has a second groove on an inner surface of the screw nut. The two screw nuts are installed on the screw rod such that the two screw nuts can move along the axis. The channel is formed by the first groove and the second groove. The plurality of balls is disposed in the channel. The tilt detector is disposed between the two screw nuts to detect a tilt angle of the two screw nuts, and the tilt detector includes a force-receiving element, at least one first strain sensor, and at least one second strain sensor. The force-receiving element includes at least one ring-type structure having two planes. A normal vector on a first sectional plane where the at least one ring-type structure is located is parallel to the direction of the axis, and the first sectional plane and the axis are intersected at a first intersection. The two planes are parallel to each other and the two planes are respectively in contact with the two screw nuts. The at least one ring-type structure is a point-symmetric with respect to the first intersection.

The ball screw of the disclosure includes a screw rod, two screw nuts, a channel, a plurality of balls, and a tilt detector. The screw rod has a first groove on an outer surface of the screw rod and is extended along a direction of an axis. Each of the two screw nuts has a second groove on an inner surface of the two screw nuts. The two screw nuts are installed on the screw rod such that the two screw nuts can move along the axis. The channel is formed by the first groove and the second groove. The plurality of balls is disposed in the channel. The tilt detector is disposed between the two screw nuts to detect a tilt angle of the two screw nuts, and the tilt detector includes a force-receiving element, at least one first strain sensor, at least one second strain sensor, at least one reference strain sensor, and at least one temperature sensor. The force-receiving element includes at least one ring-type structure. The at least one ring-type structure has two planes. A normal vector on a first sectional plane where the at least one ring-type structure is located is parallel to the direction of the axis, and the first sectional plane and the axis are intersected at a first intersection. The two planes are parallel to each other, and the two planes are respectively in contact with the two screw nuts. The at least one ring-type structure is a point-symmetric with respect to the first intersection. The at least one first strain sensor and the at least one second strain sensor are disposed in a high-strain region of the force-receiving element. The at least one reference strain sensor and the at least one temperature sensor are disposed in a low-strain region of the force-receiving element.

The ball screw of the disclosure includes a screw rod, two screw nuts, a channel, a plurality of balls, and a tilt detector. The screw rod has a first groove on an outer surface of the screw rod and is extended along a direction of an axis. Each of the two screw nuts has a second groove on an inner surface of the screw nut. The two screw nuts are installed on the screw rod such that the two screw nuts can move along the axis. The channel is formed by the first groove and the second groove. The plurality of balls is disposed in the channel. The tilt detector is disposed between the two screw nuts to detect a tilt angle of the two screw nuts, and the tilt detector includes a force-receiving element, at least one first sensing unit, at least one second sensing unit, at least one first strain sensor, at least one second strain sensor, at least one reference strain sensor, and at least one temperature sensor. The force-receiving element includes at least one ring-type structure having two planes. A normal vector on a first section plane where the at least one ring-type structure is located is parallel to the direction of the axis, and the first sectional plane and the axis are intersected at a first intersection. The at least one first sensing unit includes at least one first cavity, at least one first column, and at least one first hole. The at least one second sensing unit includes at least one second cavity, at least one second column, and at least one second hole. A normal vector on a third sectional plane where the at least one first sensing unit and the at least one second sensing unit are located is parallel to the direction of the axis, the third sectional plane and the axis are intersected at a third intersection, the two planes are parallel to each other and the two planes are respectively in contact with the two screw nuts, and the at least one ring-type structure is a point-symmetric with respect to the first intersection. The at least one first sensing unit and the at least one second sensing unit are disposed in the at least one ring-type structure in a point-symmetric manner with respect to the third intersection. A flexural rigidity of the at least one first sensing unit and a flexural rigidity of the at least one second sensing unit are respectively less than a flexural rigidity of the at least one ring-type structure. The two ends of the at least one column are respectively connected to an upper surface and a lower surface of the at least one first cavity. The at least one first hole is disposed in the at least one first column to form two first supporting walls, each of the first supporting walls includes at least one exterior surface and at least one interior surface, the at least one exterior surface and the upper surface of the at least one first cavity or the lower surface of the at least one first cavity define an external joint angle, the at least one interior surface and the upper surface of the at least one first cavity or the lower surface of the at least one first cavity define an internal joint angle, the internal joint angle is greater than the external joint angle, and the at least one reference strain sensor and the at least one temperature sensor are disposed on the upper surface of the at least one first cavity or the lower surface of the at least one first cavity.

The ball screw of the disclosure includes a screw rod, two screw nuts, a channel, a plurality of balls, and a tilt detector. The screw rod has a first groove on an outer surface of the screw rod and is extended along a direction of an axis. Each of the two screw nuts has a second groove on an inner surface of the screw nut. The two screw nuts are installed on the screw rod such that the two screw nuts can move along the axis. The channel is formed by the first groove and the second groove. The plurality of balls is disposed in the channel. The tilt detector is disposed between the two screw nuts to detect a tilt angle of the two screw nuts and to generate a preload between the balls and the corresponding first groove and the second groove.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
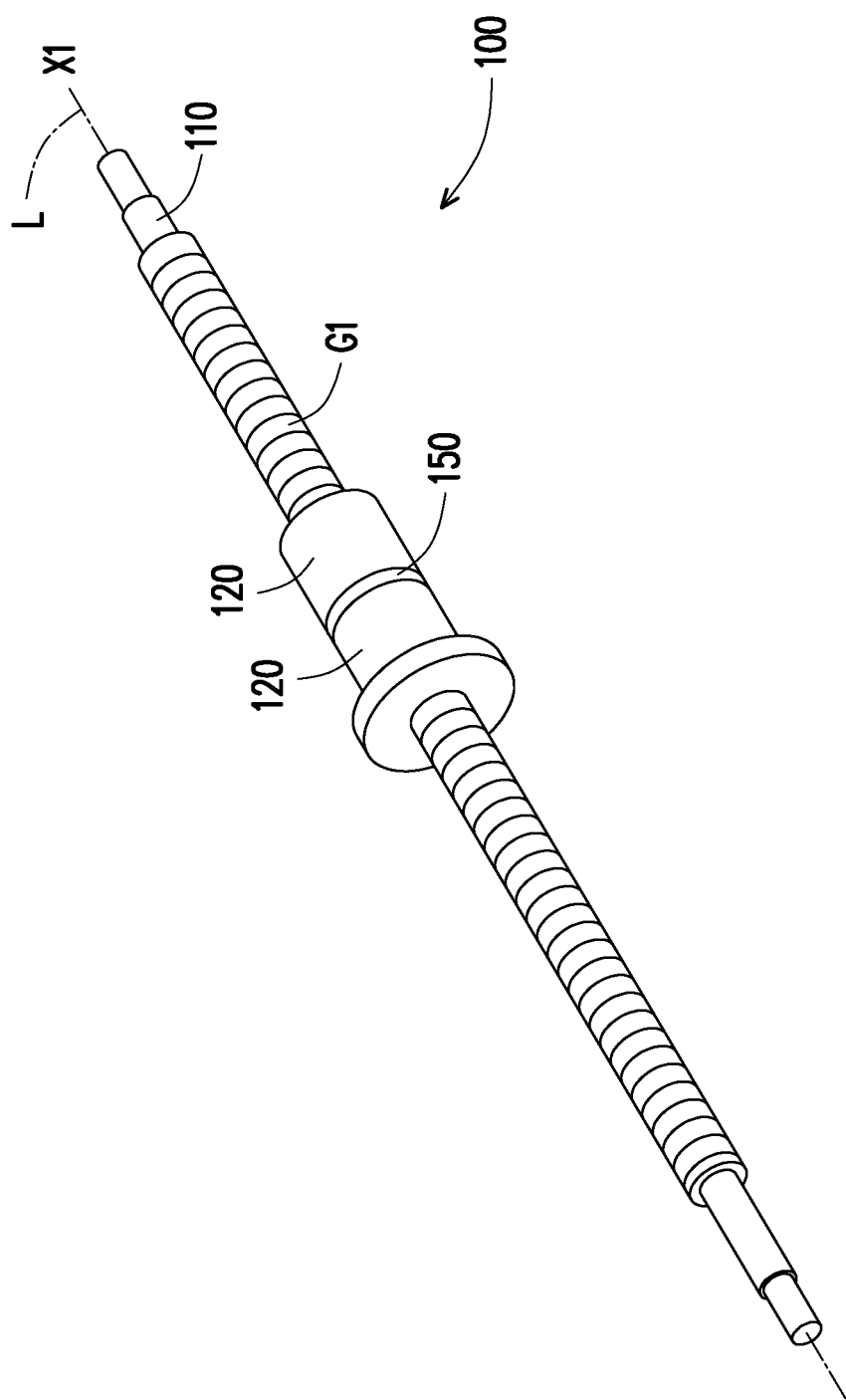
FIG. 1A is a perspective view of a ball screw of an embodiment of the disclosure.
Figure 1B:
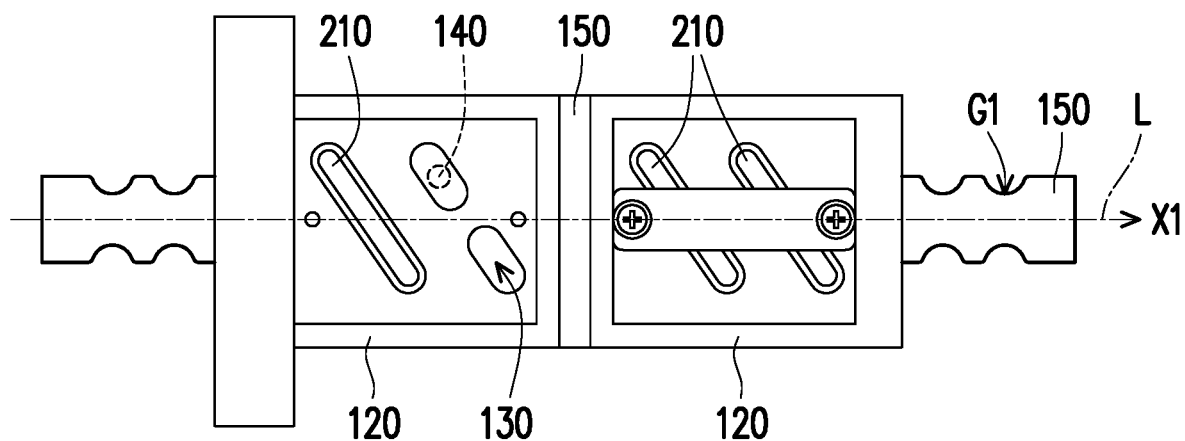
FIG. 1B is an enlarged view of the ball screw of FIG. 1A.
Figure 1C:
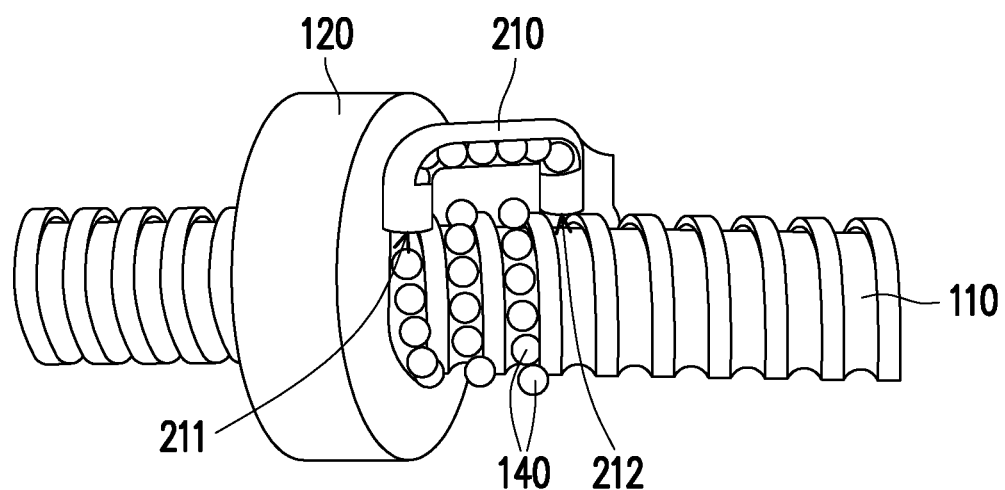
FIG. 1C and FIG. 1D show installation schematics of a reflow element and balls of FIG. 1B.
Figure 1D:
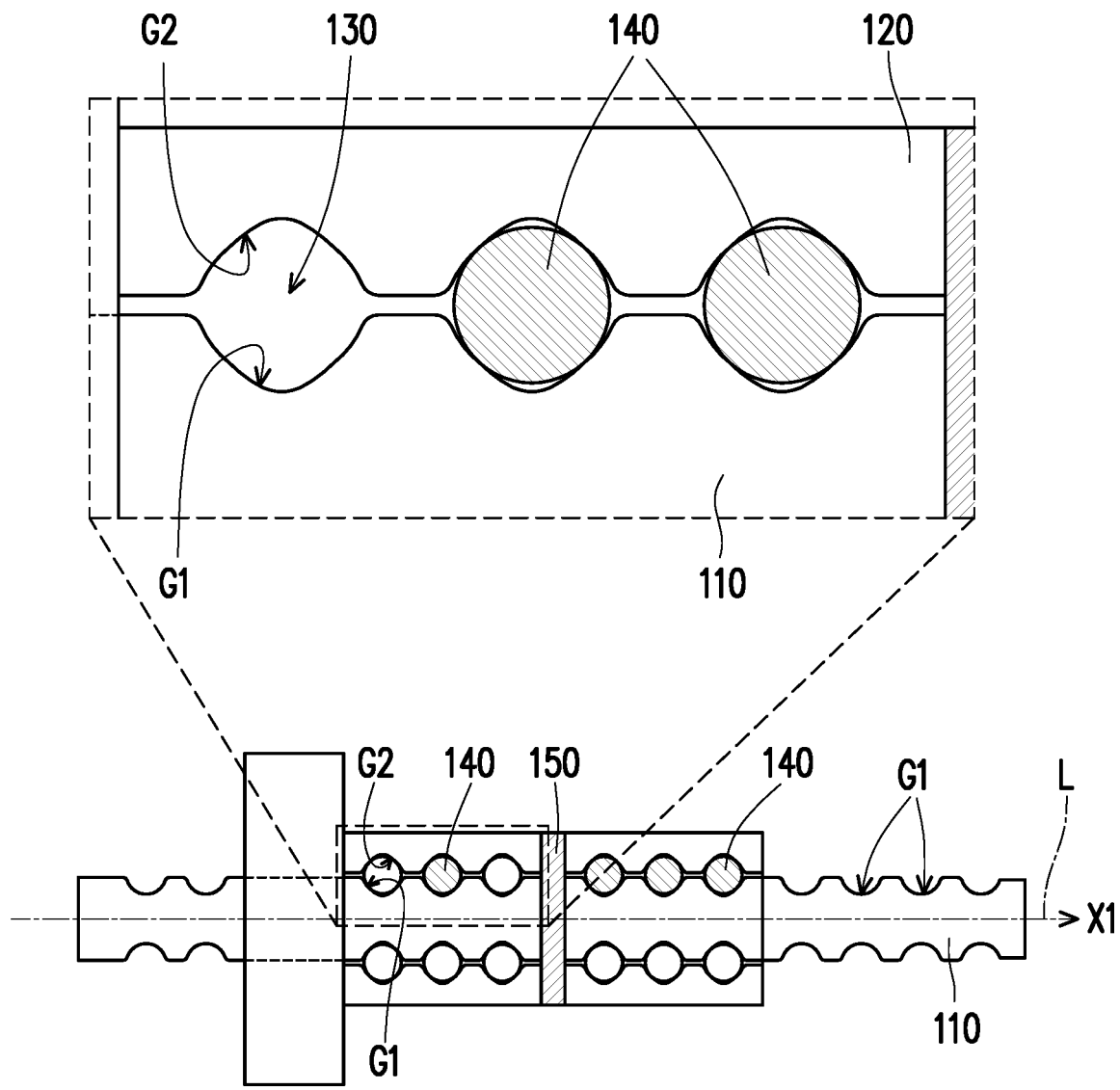
Figure 1E:
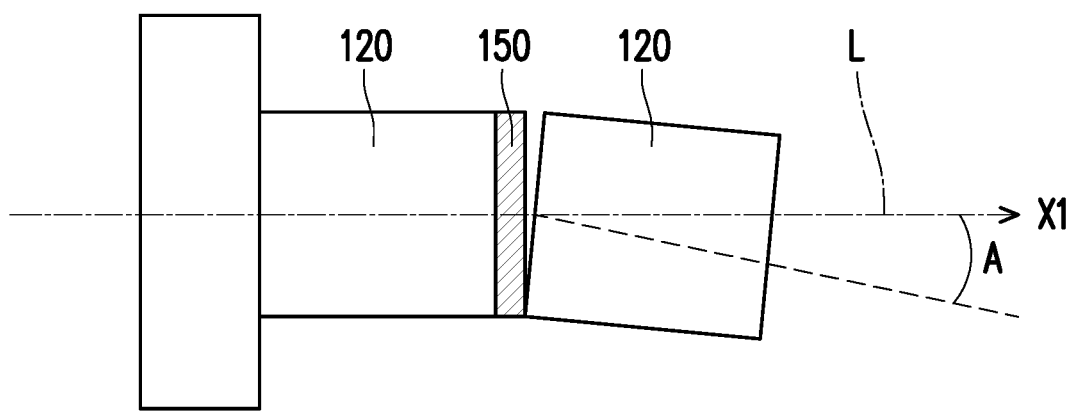
FIG. 1E is a schematic view showing one of screw nuts in FIG. 1B being tilted.

FIG. 1A is a perspective view of a ball screw of an embodiment of the disclosure. FIG. 1B is an enlarged view of the ball screw of FIG. 1A. FIG. 1C and FIG. 1D show installation schematics of a reflow element and balls of FIG. 1B. FIG. 1E is a schematic view showing one of screw nuts in FIG. 1B being tilted.

Referring to FIG. 1A and FIG. 1B, a ball screw 100 of the disclosure includes a screw rod 110, two screw nuts 120, a channel 130, a plurality of balls 140, and a tilt detector 150. The screw rod 110 is, for instance, a metal rod formed via an extension along a direction X1 of an axis L, and an outer surface of the screw rod 110 has a first groove G1. Specifically, the first groove G1 is, for instance, indented into the external thread of the screw rod 110, and the first groove G1 is extended to two ends of the screw rod 110.

Referring to FIG. 1C and FIG. 1D, the two screw nuts 120 are installed onto the screw rod 110 via rotation, and a tilt detector 150 is disposed between the two screw nuts 120. An inner surface of each of the screw nuts 120 has a second groove G2. Specifically, each of the second grooves G2 is, for instance, screwed into the internal thread of the screw nuts 120. Each of the second grooves G2 respectively corresponds to the first groove G1, and the first groove G1 and the corresponding second grooves G2 form a channel 130. Referring to FIG. 1B and FIG. 1C, a reflow element 210 is disposed in the two screw nuts 120 and has a first opening 211 and a second opening 212.

A plurality of balls 140 is disposed in the channel 130 between the two screw nuts 120 and the screw rod 110. When the two screw nuts 120 and the screw rod 110 are rotated relatively to each other, each of the balls 140 is suitable for rolling between the first groove G1 and the second grooves G2. And each of the balls 140 enters the reflow element 210 from the first opening 211 (or the second opening 212), and then leaves the reflow element 210 from the second opening 212 (or the first opening 211) to complete a rolling loop. Therefore, the two screw nuts 120 may generate a linear movement along the direction of the axis X1 of the screw rod 110 via the rolling of the plurality of balls 140 in the channel 130.

Figure 2A:
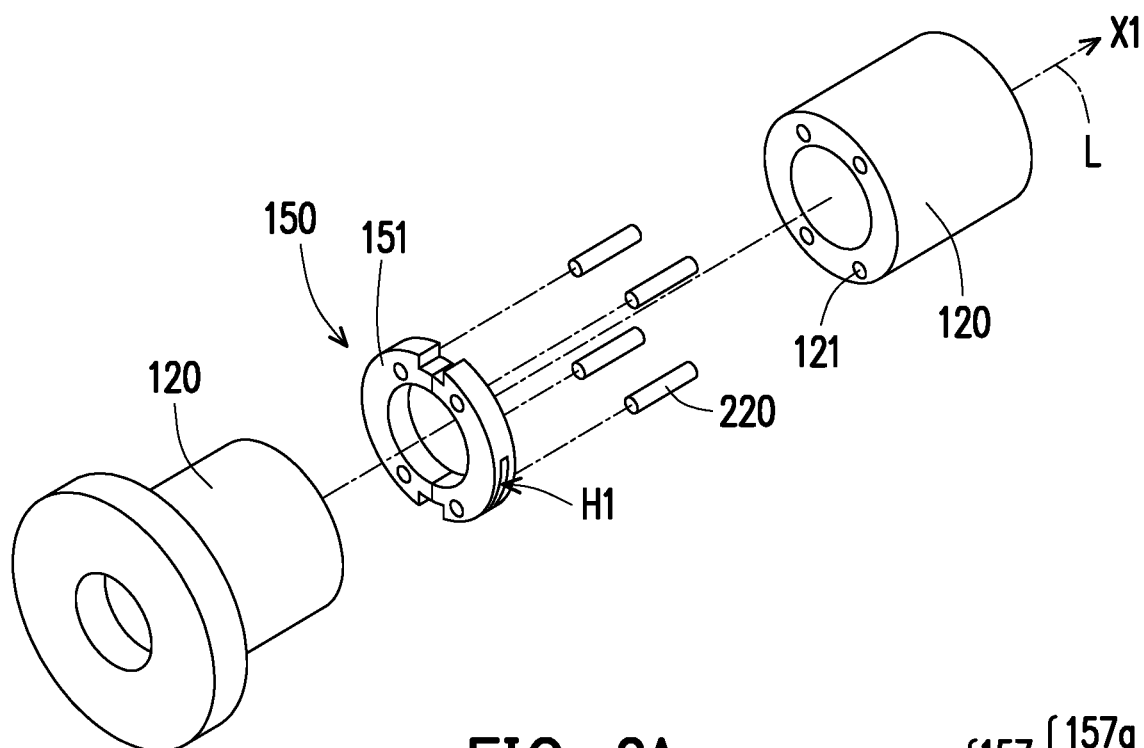
FIG. 2A is an exploded view of a screw nut and a tilt detector of the ball screw of FIG. 1A.
Figure 2B:
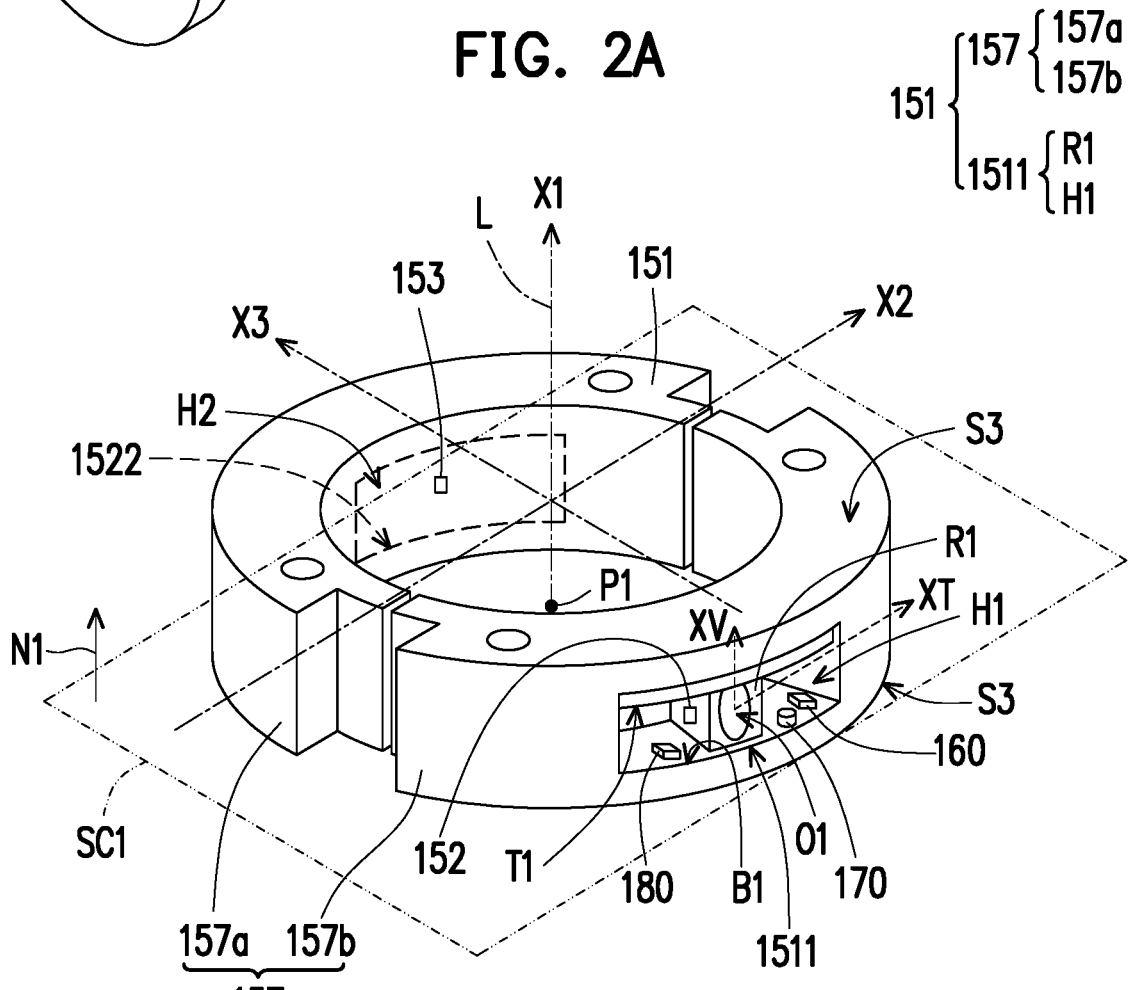
FIG. 2B is an enlarged view of the tilt detector of FIG. 2A and a first section plane.
Figure 2C:
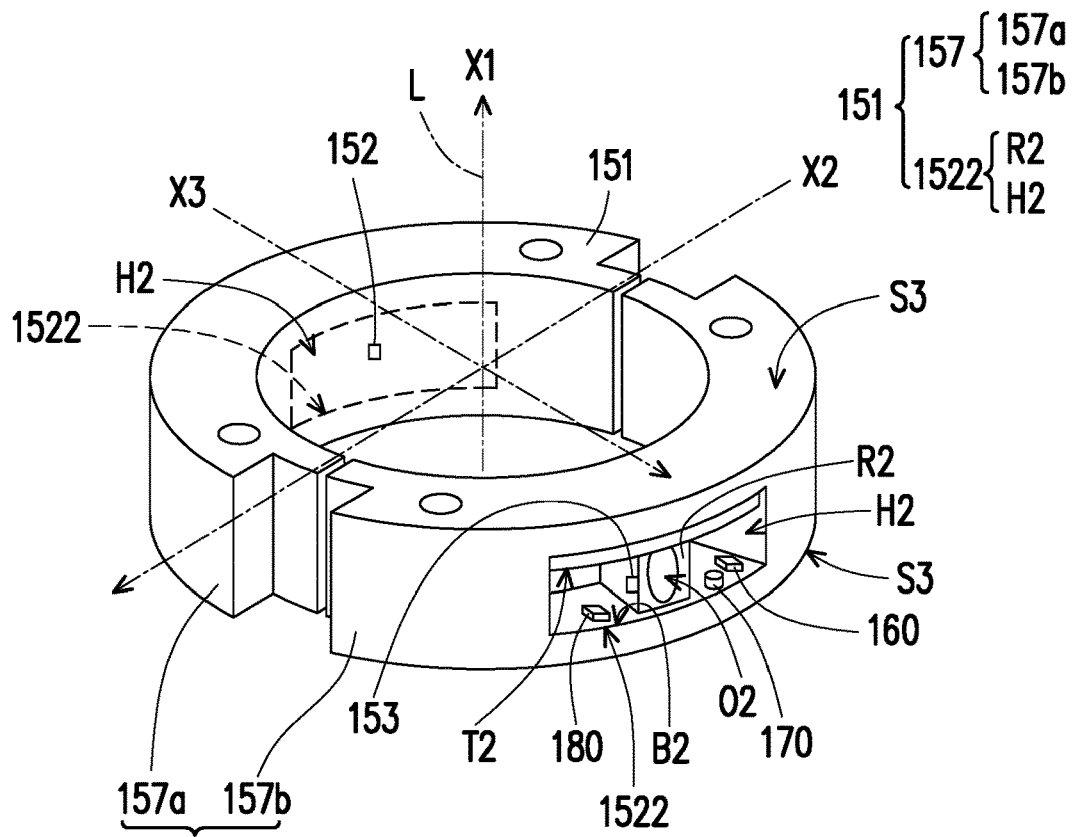
FIG. 2C is an enlarged view of the tilt detector of FIG. 2B after a 180-degree rotation along a direction of an axis.
Figure 2D:
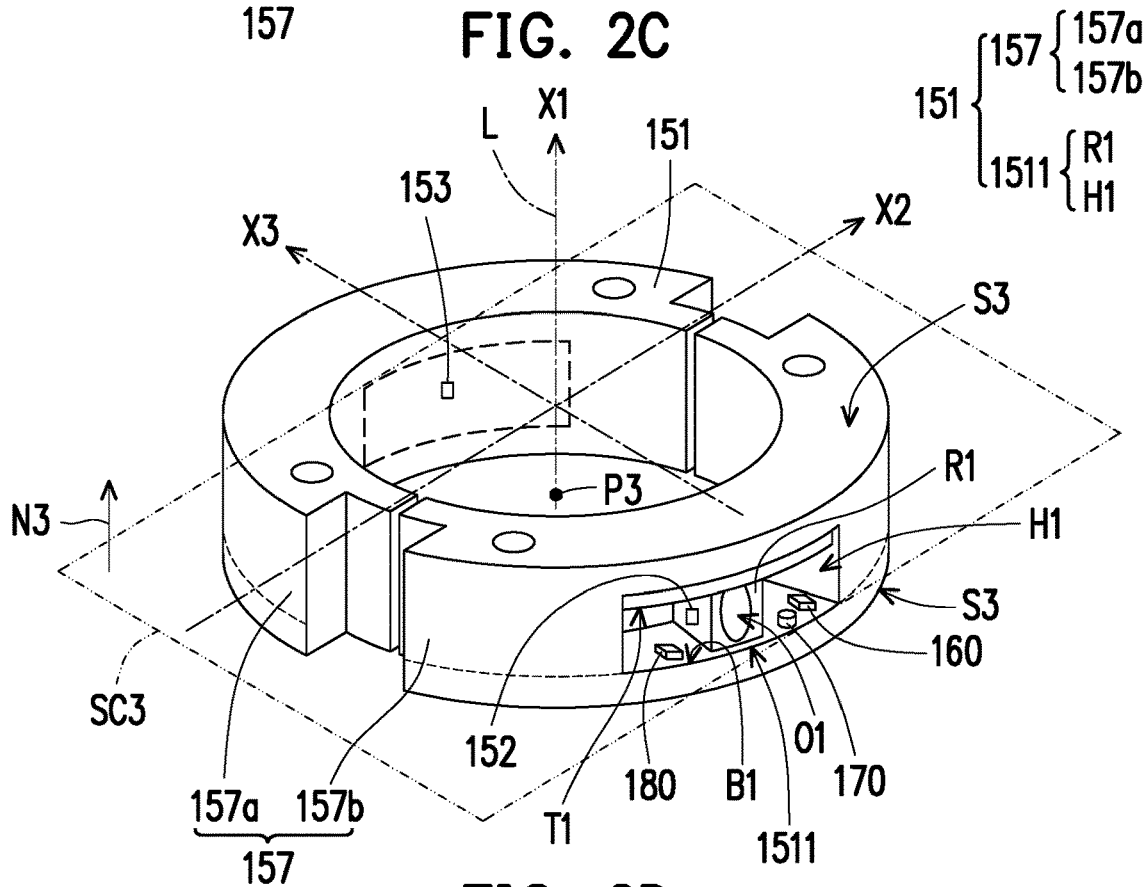
FIG. 2D is an enlarged view of the tilt detector of FIG. 2B and a third section plane.
Figure 2E:
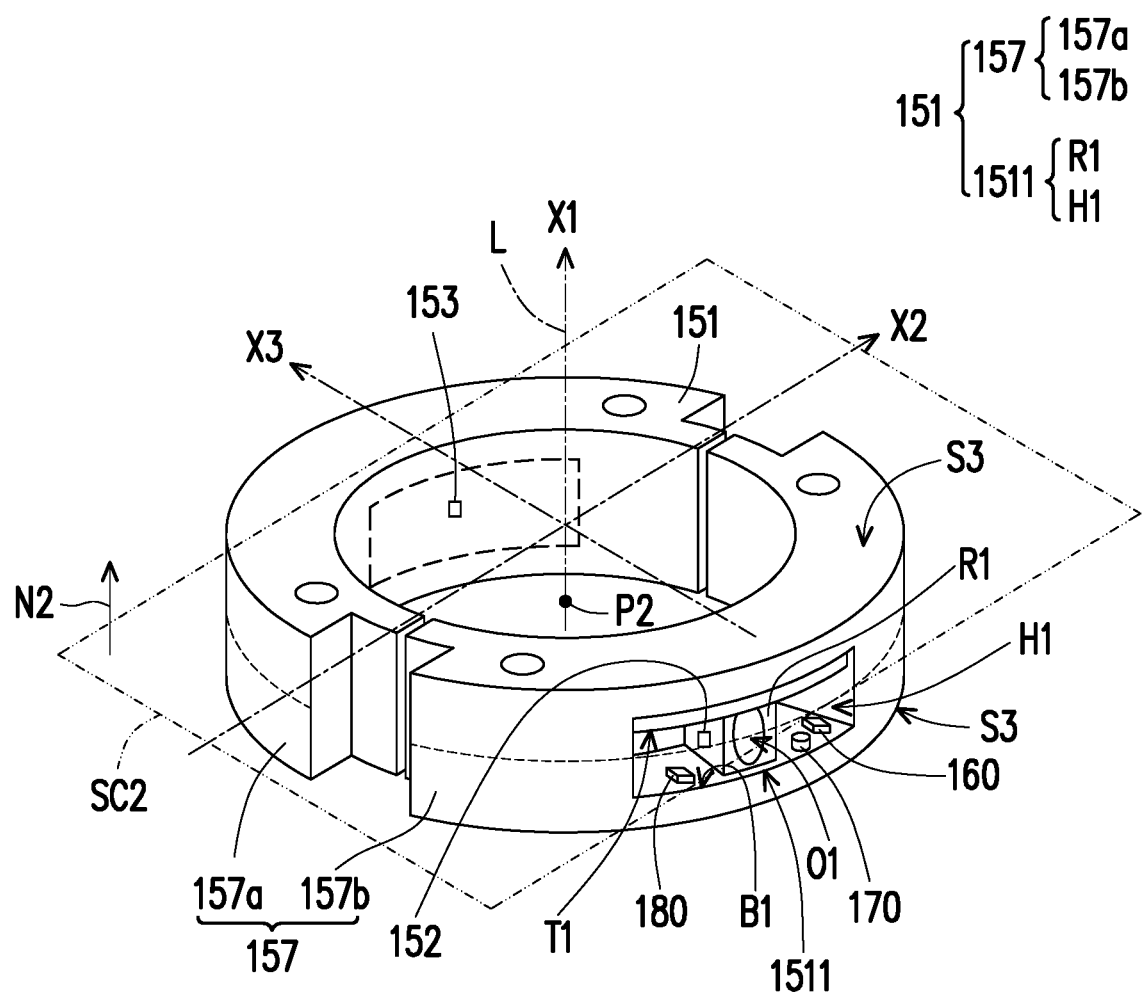
FIG. 2E is an enlarged view of the tilt detector of FIG. 2B and a second section plane.

FIG. 2A is an exploded view of a screw nut and a tilt detector of the ball screw of FIG. 1A. FIG. 2B is an enlarged view of the tilt detector of FIG. 2A and a first sectional plane SC1. FIG. 2C is an enlarged view of the tilt detector of FIG. 2B after a 180-degree rotation with respective to the axis L. FIG. 2D is an enlarged view of the tilt detector of FIG. 2B and a third sectional plane SC3. FIG. 2E is an enlarged view of the tilt detector of FIG. 2B and a second sectional plane SC2.

Referring to FIG. 1B, FIG. 2A, FIG. 2B, and FIG. 2C, the tilt detector 150 is disposed between the two screw nuts 120 and configured to detect a tilt angle A of each of the screw nuts 120 relative to the direction of the axis X1 of the screw rod 110 (refer to FIG. 1E). In the present embodiment, the tilt detector 150 is disposed between the two screw nuts 120 by passing at least one of positioning elements 220 through a positioning hole of the tilt detector 150, and through positioning holes 121 of the two screw nuts 120 as shown in FIG. 2A.

Specifically, the tilt detector 150 includes a force-receiving element 151, at least one first strain sensor 152, and at least one second strain sensor 153. The force-receiving element 151 includes a ring-type structure 157, a first sensing unit 1511, and a second sensing unit 1522. In the present embodiment, the ring-type structure 157 is formed by two independent half-ring-type structures 157a and 157b. The first sensing unit 1511 includes at least one first cavity H1 and at least one first column R1, and the second sensing unit 1522 includes at least one second cavity H2 and at least one second column R2. Referring to FIG. 2B and FIG. 2C, a normal vector N1 on a first sectional plane SC1 where the ring-type structure 157 is located is parallel to the direction of the axis X1 and the first sectional plane SC1 and the axis L are intersected at a first intersection P1. The ring-type structure 157 is a point-symmetric structure with respective to the first intersection P1. In the disclosure, the structure is point-symmetric structure, if each portion of the structure is rotated 180 degrees with respect to the first intersection P1 on the first sectional plane SC1, then there exists one matching portion of the structure which coincides with the each portion of the structure being rotated. Moreover, the ring-type structure 157 has two planes S3 parallel to each other, and each of the planes S3 is respectively in contact with each of the screw nuts 120. More specifically, the two planes S3 parallel to each other may be respectively pressed on the two screw nuts 120 such that a preload is generated. The preload between each of the balls 140 and the corresponding first groove G1 and second groove G2 can prevent the two screw nuts 120 from tilting in the direction of the axis X1 (refer to FIG. 1E). More specifically, the point-symmetric ring-type structure 157 and the two parallel planes S3 are designed for allowing the force-receiving element 151 to accurately measure a preload when each of the screw nuts 120 is not tilted in the direction of the axis X1. Moreover, the point-symmetric ring-type structure 157 and the two parallel planes S3 are also designed for allowing the force-receiving element 151 to accurately measure the tilt angle when one of the screw nuts 120 is tilted.

Moreover, the at least one first strain sensor 152 and the at least one second strain sensor 153 are disposed in the ring-type structure 157 in a point-symmetric manner. In the present embodiment, the quantity of the first strain sensor 152, for instance, is one and the quantity of the second strain sensor 153, for instance, is one. The first strain sensor 152 and the second strain sensor 153 are disposed in the ring-type structure 157 in a point-symmetric manner. However, the quantity of the first strain sensor 152 and the quantity of second strain sensor 153 is not limited in the disclosure. In another embodiments, a plurality of pairs of sensors may be disposed on the ring-type structure 157, and each pair of sensors may respectively include the first strain sensor 152 and the second strain sensor 153 disposed in the ring-type structure 157 in a point-symmetric manner. The first strain sensor 152 and the second strain sensor 153 disposed in the ring-type structure 157 in a point-symmetric manner allow the force-receiving element 151 to be the point-symmetry structure such that the force-receiving element 151 may accurately measure the preload or accurately measure the tilt angle of the screw nuts. To more specifically describe the first strain sensor 152 and the second strain sensor 153 disposed in a point-symmetric manner, referring to FIG. 2E. A sectional plane where the first strain sensor 152 and the second strain sensor 153 are located may be defined as a second sectional plane SC2, wherein a normal vector N2 of the second sectional plane SC2 is parallel to the direction of the axis X1. The second sectional plane SC2 and the axis L intersect at second intersection P2. In the disclosure, "the first strain sensor 152 and the second strain sensor 153 are respectively disposed on the force-receiving element 151 in a point-symmetric manner" indicates that if the first strain sensor 152 is disposed on the second sectional plane SC2, then after a 180-degree rotation with respect to the second intersection P2, the first strain sensor 152 is coincided with the corresponding second strain sensor 153.

According to an embodiment of the disclosure, various forms of the force-receiving element 151 may be employed. For instance, the force-receiving element 151 may include a one-piece ring-type structure or include a two-piece ring-type structure formed by two independent elements. The shape of the ring-type structure may also be a point-symmetric polygon such as a square or an equiangular hexagon. In addition, in other embodiments, if the shape of the ring-type structure is not the point-symmetric polygon, the shape of the ring-type structure may be an equilateral polygon (e.g. regular triangle or equilateral pentagon). In such embodiments, at least one of the strain sensors should be disposed on the outer lateral surface of each side of the ring-type structure (i.e. the normal vector of the outer lateral surface is perpendicular to the direction of the axis X1) such that the force-receiving element may accurately measure a preload or accurately measure the tilt angle of the screw nuts. More specifically, when the two screw nuts are not tilted, the absolute value of the difference between the electrical signal generated by the strain sensor on the outer lateral surface of one side of the ring-type structure and the electrical signal generated by the strain sensor on the outer lateral surface of another side of the ring-type structure may be less than a predetermined value. In contrast, when the two screw nuts are tilted, the absolute value of the difference between the electrical signal generated by the strain sensor on the outer lateral surface of one side of the ring-type structure and the electrical signal generated by the strain sensor on the outer lateral surface of another side of the ring-type structure may be greater than a predetermined value.

As shown in FIG. 2A and FIG. 2B, the force-receiving element 151 includes a ring-type structure 157 formed by two independent half-ring-type structures 157a and 157b and two sensing units (the first sensing unit 1511 and the second sensing unit 1522). The first sensing unit 1511 and the second sensing unit 1522 are disposed in the ring-type structure 157 in a point-symmetric manner. Moreover, the flexural rigidity of the first sensing unit 1511 and the flexural rigidity of the second sensing unit 1522 are respectively less than the flexural rigidity of the ring-type structure 157. Specifically, when taking a plane on which a longitudinal axis XV and a transverse axis XT are located as a bending plane, the first sensing unit 1511 has a flexural rigidity (i.e. the product of the Young's modulus of the first sensing unit 1511 and the moment of inertia of the first sensing unit 1511). And when taking a plane on which one axis X1 and another axis X2 are located, the ring-type structure 157 has a flexural rigidity (i.e. the product of the Young's modulus of the ring-type structure 157 and the moment of inertia of the ring-type structure 157). The flexural rigidity of the first sensing unit 1511 is smaller than the flexural rigidity of the ring-type structure 157. Similarly, the second sensing unit 1522 has a flexural rigidity (i.e. the product of the Young's modulus of the second sensing unit 1522 and the moment of inertia of the second sensing unit 1522). The flexural rigidity of the second sensing unit 1522 is smaller than the flexural rigidity of the ring-type structure 157.

As described above, the design in which the flexural rigidity of the first sensing unit 1511 and the flexural rigidity of the second sensing unit 1522 are respectively less than the flexural rigidity of the ring-type structure 157 allows the ring-type structure 157 to apply a suitable preload to the two screw nuts 120, and allows better measuring sensitivity to be achieved when the first strain sensor 152 and the second strain sensor 153 are measuring the strains of the force-receiving element 151. For instance, the first sensing unit 1511 includes a first cavity H1 and a first column R1 disposed at one outer portion of the ring-type structure 157. The first cavity H1 has a plurality of inner surfaces including an upper surface T1, a lower surface B1, a left surface, and a right surface. The two ends of the first column R1 are respectively connected to the upper surface T1 and the lower surface B1 of the first cavity H1. Similarly, the second sensing unit 1522 includes a second cavity H2 and a second column R2 disposed at another outer portion of the ring-type structure 157. The second cavity H2 has a plurality of inner surfaces including an upper surface T2, a lower surface B2, a left surface, and a right surface. The two ends of the second column R2 are respectively connected to the upper surface T2 and the lower surface B2 of the second cavity H2. In the present embodiment, the flexural rigidity of the first sensing unit 1511 is less than the flexural rigidity of the ring-type structure 157 and the flexural rigidity of the second sensing unit 1522 is less than the flexural rigidity of the ring-type structure 157. Therefore, when the two screw nuts 120 apply forces F1 and F2 to the force-receiving element 151, a greater lateral deflection may be generated by the first sensing unit 1511. In other words, the displacement of the first column R1 in the axis XT or displacement of the second column R2 in the axis XT can be greater than the displacement of the ring-type structure 157 in the direction of axis X2 (or axis X3). It allows the tilt detector 150 to have a better sensitivity in measuring the tilt angle or in measuring the preload of the two screw nuts.

Moreover, the first strain sensor 152 is disposed on the first column R1 of the first sensing unit 1511 to sense the strain of the first column R1. The second strain sensor 153 is disposed on the second column R2 of the second sensing unit 1522 to sense the strain of the second column R2. The first sensing unit 1511 and the second sensing unit 1522 disposed in the ring-type structure 157 in a point-symmetric manner. It makes the force-receiving element 151 to be the point-symmetric structure, such that a preload can be accurately measured or the tilt angle of the screw nuts 120 can be accurately measured when the force-receiving element 151 is subjected to the forces F1 and F2 of the two screw nuts 120.

To more specifically describe the first sensing unit 1511 and the second sensing unit 1522 disposed in a point-symmetric manner, referring to FIG. 2D, a sectional plane where the first sensing unit 1511 and the second sensing unit 1522 are located may be defined as a third section plane SC3. A normal vector N3 of the third sectional plane SC3 is parallel to the direction of the axis X1. A third intersection of the third sectional plane SC3 and the axis L may be defined as a third point intersection P3. In the present embodiment, "the first sensing unit 1511 and the second sensing unit 1522 are respectively disposed in the ring-type structure 157 in a point-symmetric manner" indicates that after the first column R1 and the first cavity H1 in the first sensing unit 1511 are rotated by 180 degrees with respect to the third intersection P3 on the third section plane SC3, the first column R1 and the first cavity H1 are respectively coincided with the second column R2 and the second cavity H2 in the corresponding second sensing unit 1522.

Figure 3A:
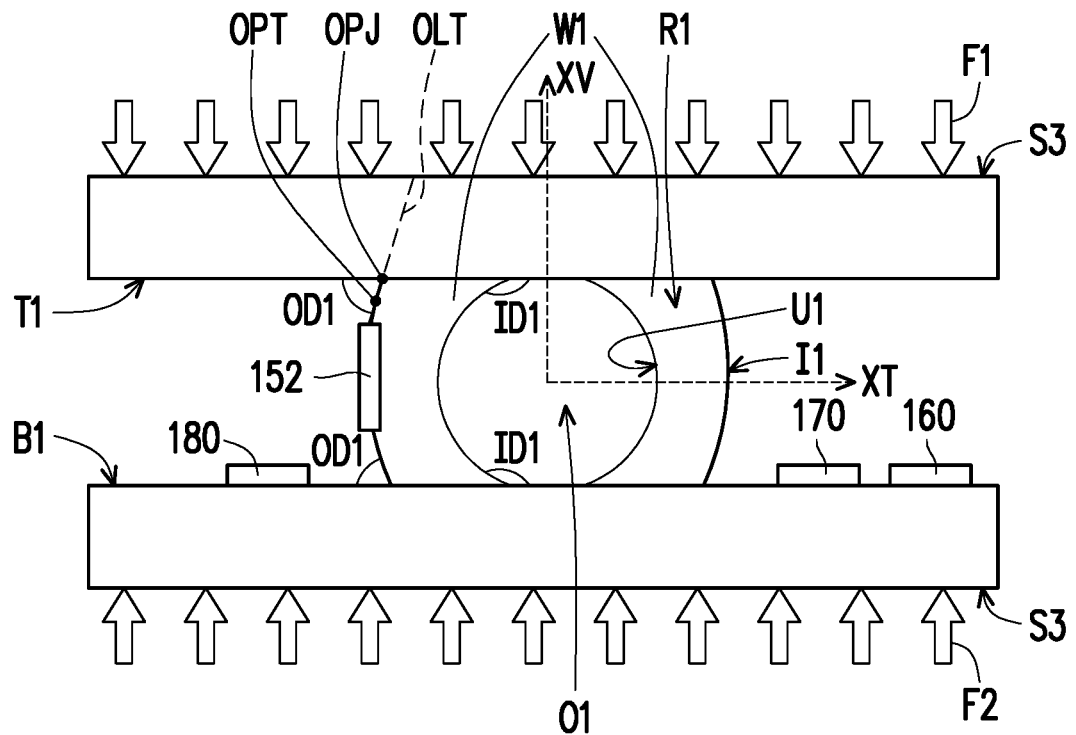
FIG. 3A and FIG. 3B show sensing schematics of the tilt detector of FIG. 1B subjected to force.
Figure 3B:
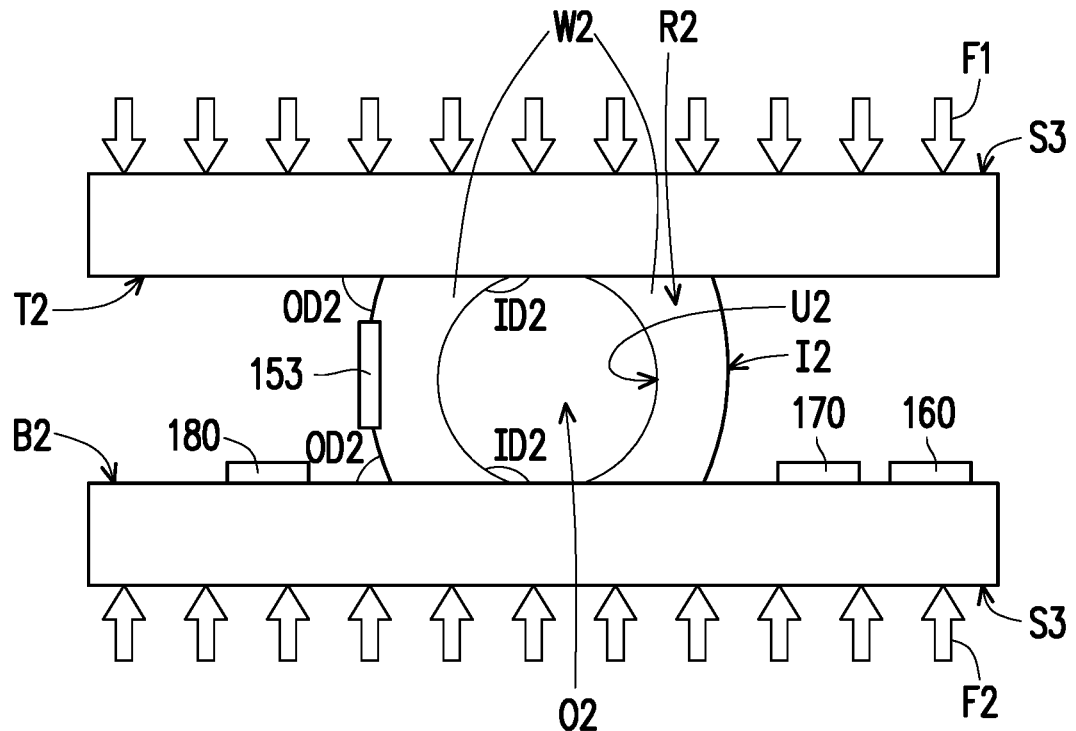

FIG. 3A and FIG. 3B show schematics of the tilt detector of FIG. 1B subjected to forces F1 and F2. According to an embodiment of the disclosure, the first column R1 may be further designed. Specifically, as shown in FIG. 3A and FIG. 3B, a first hole O1 may be formed on the first column R1 in the present embodiment. The first hole O1 may be a through hole passing through the first column R1 or a blind hole disposed in the first column R1. The first hole O1 can make the first column R1 to be two opposite first supporting walls W1. The first hole O1 disposed on the first column R1 may reduce the flexural rigidity of the first column R1 in the direction of the axis X1 of the screw rod 110, thereby reducing the flexural rigidity of the first sensing unit 1511 and improving the measuring sensitivity of the first strain sensor 152.

More specifically, each of the first supporting walls W1 respectively includes a first exterior surface I1 and a first interior surface U1. The first exterior surface I1 of the first supporting walls W1 and the upper surface T1 of the first cavity H1 may define a first external joint angle OD1. And the first exterior surface I1 of the first supporting walls W1 and the lower surface B1 of the first cavity H1 may also define a first external joint angle OD1. Similarly, the first interior surface U1 and the upper surface T1 of the first cavity H1 may define an internal joint angle ID1. The first interior surface U1 and the lower surface B1 of the first cavity H1 may also define an internal joint angle ID1. Based on different design requirements, the first external joint angle OD1 and the first internal joint angle ID1 may be different. In an embodiment, the first external joint angle OD1 may be an acute angle, and the first internal joint angle ID1 may be an obtuse angle. In this embodiment, the first internal joint angle ID1 is greater than the first external joint angle OD1. When the first column R1 is subjected to forces F1 and F2 respectively, each of the first supporting walls W1 of the first column R1 is to be bent from the first interior surface U1 toward the first exterior surface I1.

Similarly, because the first internal joint angle ID1 is greater than the first external joint angle OD1, each of the second supporting walls W2 of the second column R2 is to be bent from the second interior surface U2 toward the second exterior surface I2 when the second column R2 is subjected to the forces F1 and F2 respectively.

In order to clearly define the first external joint angle OD1, referring to FIG. 2B and FIG. 3A. FIG. 3A is a cross-sectional schematic showing the first column R1, the upper surface T1 of the first cavity H1 and the lower surface B1 of the first cavity H1. The normal vector of the cross-sectional schematic is parallel to the direction of axis X3. In this cross-sectional schematic, the upper surface T1 of the first cavity H1 and the first exterior surface I1 are connected and to form an external joint point OPJ. An outer tangent line OLT passes through the external joint point OPJ and is contact the first exterior surface I1 at an outer tangent point OPT. The first external joint angle OD1 may be defined as the angle between the outer tangent line OLT and the upper surface T1 of the first cavity H1. The second external joint angle OD2 can be defined in the similar way.

In addition, in the cross-sectional schematic shown in FIG. 3A, the upper surface T1 of the first cavity H1 and the first interior surface U1 are connected to form an internal joint point IPJ (not illustrated). An inner tangent line ILT (not illustrated) passes through the internal joint point IPJ and is contact the first interior surface U1 at an inner tangent point IPT. The first internal joint angle ID1 may be defined as the angle between the inner tangent line ILT and the upper surface T1 of the first cavity H1. The second internal joint angle ID2 can be defined in the similar way.

The design in which each of the first supporting walls W1 of the first column R1 and each of the second supporting walls W2 of the second column R2 may be bent from the interior surface toward the exterior surface allows the first strain sensor 152 and the second strain sensor 153 to accurately generate an electrical signal for an application-specific integrated circuit chip (ASIC chip) to calculate an accurate value of preload. In the present embodiment, since the first external joint angle OD1 is an acute angle and the first internal joint angle ID1 is an obtuse angle, when the first column R1 is subjected to the forces F1 and F2 respectively, each of the first supporting walls W1 of the first column R1 is bent from the first interior surface U1 toward the first exterior surface I1. Similarly, since the second external joint angle OD2 is an acute angle and the second internal joint angle ID2 is an obtuse angle, when the second column R2 is subjected to the forces F1 and F2 respectively, each of the second supporting walls W2 of the second column R2 is also bent from the second interior surface U2 toward the second exterior surface I2. In another embodiment, the first external joint angle is greater than the first internal joint angle, and the second external joint angle is greater than the second internal joint angle. It ensures that when the first column R1 and the second column R2 are subjected to the forces F1 and F2 respectively, each of the first supporting walls W1 of the first column R1 and each of the second supporting walls W2 of the second column R2 is to be bent from the exterior surface toward the interior surface.

The first strain sensor 152 may be disposed on the first exterior surface I1 or on the first interior surface U1 of the first column R1. At the same time, the second strain sensor 153 may be disposed on the second exterior surface I2 or on the second interior surface U2 of the second column R2. The first exterior surface I1 or the first interior surface U1 is a high-strain region of the first column R1 when subjected to the forces F1 and F2. Similarly, the second exterior surface I2 or the second interior surface U2 is a high-strain region of the second column R2 when subjected to the forces F1 and F2. Both the first strain sensor 152 and the second strain sensor 153 are disposed in a high-strain region. Therefore, the first strain sensor 152 may sense the first strain of the first column R1 with high sensitivity and generates a first electrical signal. The second strain sensor 153 may also sense the second strain of the second column R2 with high sensitivity and generates a second electrical signal. By comparing the difference between the first electrical signal and the second electrical signal, it can be determined whether the two screw nuts 120 are tilted or not.

Figure 4A:
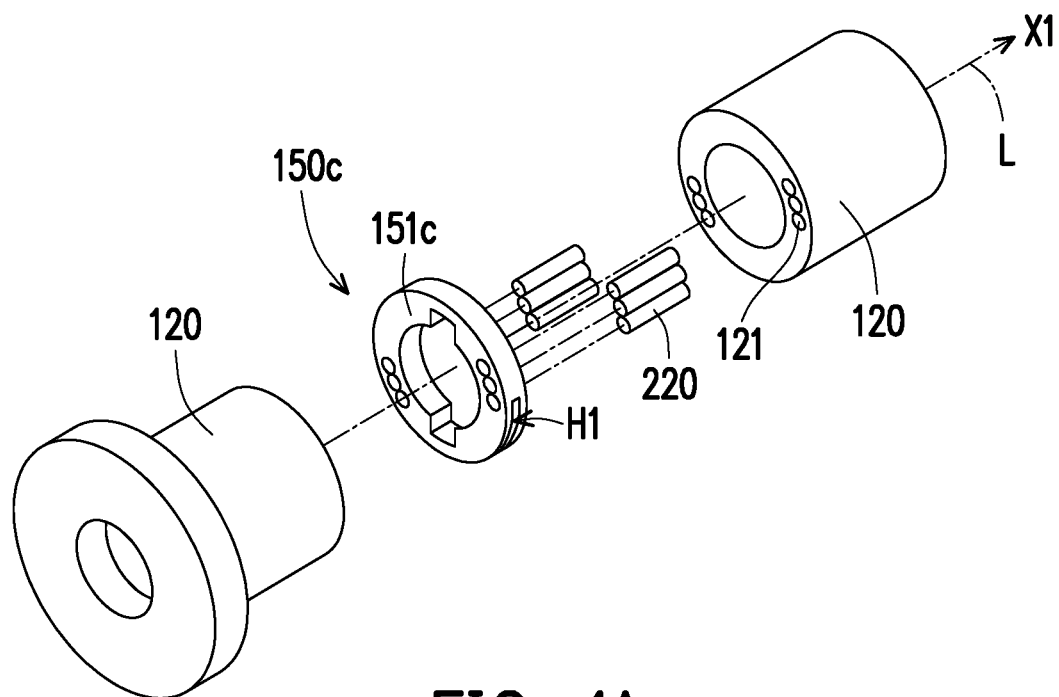
FIG. 4A shows an exploded view of a screw nut and a tilt detector of a ball screw of another embodiment of the disclosure.
Figure 4B:
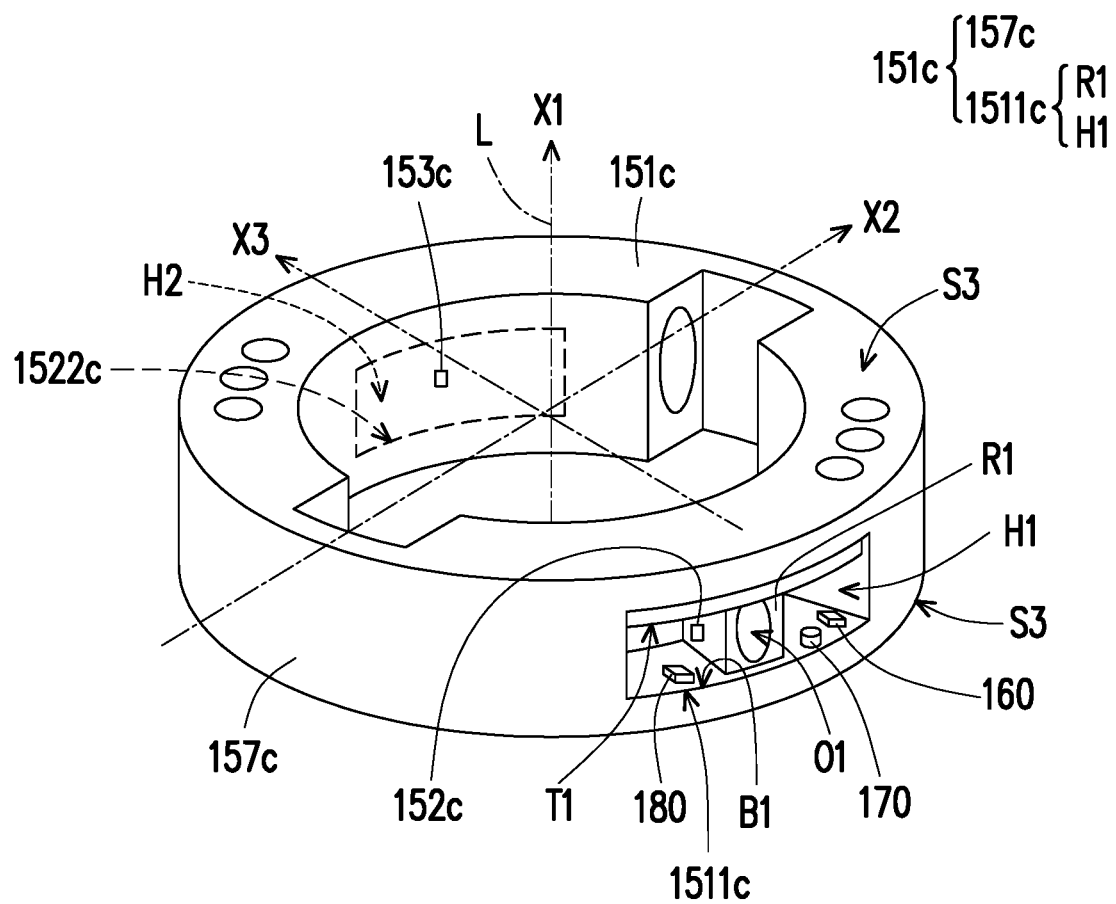
FIG. 4B is an enlarged view of the tilt detector of FIG. 4A.

FIG. 4A shows an exploded view of a screw nut and a tilt detector of a ball screw of another embodiment of the disclosure. FIG. 4B is an enlarged view of the tilt detector of FIG. 4A. Referring to FIG. 4A and FIG. 4B, a tilt detector 150c of the present embodiment includes a force-receiving element 151c, a first strain sensor 152c, a second strain sensor 153c, and two sensing units 1511c and 1522c. The two sensing units 1511c and 1522c are respectively disposed at two outer sides of the ring-type structure 157c in a point-symmetric manner. The tilt detector 150c of the present embodiment is substantially the same as that of FIG. 2A. The difference between the two embodiments is that the force-receiving element 151c of the tilt detector 150c includes a one-piece ring-type structure 157c.

Referring to FIG. 1B, FIG. 1E, FIG. 3A, and FIG. 3B, the sensing method of the tilt detector 150 of the ball screw 100 for the tilt angle of each of the screw nuts 120 is described below.

In the present embodiment, the ASIC chip 160 is, for instance, disposed in a low-strain region (such as the lower surface B1 of the first cavity H1) in the tilt detector 150 and is able to transmit an electrical signal by way of wireless transmission. In other embodiments, the ASIC chip is, for instance, disposed outside the ball screw and transmits an electrical signal by conductive wires. When the two screw nuts 120 are respectively pressed on the force-receiving element 151, the two opposite forces F1 and F2 respectively apply on the two parallel planes S3. The two forces F1 and F2 causes the two columns (the first column R1 and the second column R2) of the force-receiving element 151 to be strained at the same time. The first strain sensor 152 disposed on the first column R1 measures the strain of the first column R1 and generates a first electrical signal. The second strain sensor 153 disposed on the second column R2 measures the strain of the second column R2 and generates a second electrical signal.

Next, the difference between the first electrical signal and the second electrical signal is calculated via the ASIC chip 160. If the ASIC chip 160 determines the absolute value of the difference is greater than a predetermined value (i.e. the first electrical signal is greater than the second electrical signal or the second electrical signal is greater than the first electrical signal), then the strain of the column R1 and the strain of the column R2 are consider to be different. In other words, the two screw nuts 120 are not pressed on each of the planes S3 in parallel but are tilted away from the direction of the axis X1 such that the force-receiving element 151 is subjected to uneven forces. At this point, the ASIC chip 160 generates a notification signal showing the two screw nuts are tilted, and then informs users to overhaul the ball screw. When the ASIC chip 160 determines the absolute value of the difference is less than a predetermined value, the strain of the column R1 and the strain of column R2 are consider to be equivalent. In other words, the two screw nuts 120 are not tilted away from the direction of axis X1 and are pressed on each of the planes S3 in parallel such that the force-receiving element 151 is subjected to even forces. At this point, the ASIC chip 160 records a first electrical signal and a second electrical signal to calculate a preload applied on the balls 140 by the tilt detector 150.

More specifically, referring to FIG. 2B, FIG. 3A, and FIG. 3B, the ball screw 100 further includes two temperature sensors 170 and two reference strain sensors 180. The two temperature sensors 170 are respectively disposed inside the first cavity H1 of the first sensing unit 1511 and the second cavity H2 of the second sensing unit 1522. Similarly, the two reference strain sensors 180 are respectively disposed inside the first cavity H1 of the first sensing unit 1511 and the second cavity H2 of the second sensing unit 1522. Specifically, one of the reference strain sensors 180 and one of the temperature sensors 170 are disposed on the upper surface T1 or the lower surface B1 of the first cavity H1. The other reference strain sensor 180 and the other temperature sensor 170 are disposed on the upper surface T2 or the lower surface B2 of the second cavity H2. The upper surface T1 or the lower surface B1 of the first cavity H1 and the upper surface T2 or the lower surface B2 of the second cavity H2 are low-strain regions in the force-receiving element 151. The two temperature sensors 170 are disposed in the low-strain regions to prevent the value measured by the temperature sensors 170 from being affected via the external forces F1 and F2, thereby accurately measuring the temperature inside the ball screw. The two reference strain sensors 180 are respectively disposed in the low-strain regions to prevent the value measured by the reference strain sensors 180 from being affected by the external forces F1 and F2, thereby accurately measuring strain only generated by temperature variation.

The method of sensing and correcting the first strain sensor 152 and the second strain sensor 153 by the temperature sensor 170 and the reference strain sensor 180 is described below. The temperature sensors 170 are configured to measure the temperature inside the first cavity H1 (or the second cavity H2) disposed in the force-receiving element 151. During the operation of the ball screw, the temperature inside the first cavity H1 and the second cavity H2 may change. One of the reference strain sensors 180 is disposed on the lower surface B1 of the first cavity H1, and the region is a low-strain region inside the force-receiving element 151. Therefore, the reference strain sensor 180 only senses the strain of the force-receiving element 151 caused by temperature variation and does not sense the strain of the force-receiving element 151 caused by the forces F1 and F2. More specifically, the strain sensed by the first strain sensor 152 is caused by the temperature variation and the forces F1 and F2 at the same time. Via inputting the first electrical signal measured by the first strain sensor 152 and a reference electrical signal measured by the corresponding reference strain sensors 180 into the quarter-bridge strain gauge circuit, the influence on the strain of the force-receiving element 151 by temperature variation can be eliminated, thereby accurately calculating the magnitude of the forces F1 and F2 respectively applied to the two planes S3 of the tilt detector 150.

Based on the above, the ball screw of the disclosure may be configured to detect the tilting degree of the screw nuts and the magnitude of preload applied on the balls. When the tilting degree of the screw nuts is within an acceptable range, the ball screw of the disclosure may sense the magnitude of preload of the ball screw and the variation thereof. The ring-type structure in the force-receiving element of the tilt detector is a point-symmetric structure, and the two planes of the ring-type structure and the contact surfaces of the two screw nuts are parallel to each other, and thus the screw nuts are not readily tilted, and abrasion to the ball screw may be prevented as a result. Therefore, the ball screw of the disclosure may increase the reliability and service life of ball screw. Moreover, since the ring-type structure in the force-receiving element is a point symmetric structure and the two planes of the ring-type structure which contact the screw nut are parallel to each other, the force-receiving element may accurately sense the forces from the screw nuts in a stable manner to sense preload of the ball screw precisely. Each column in the force-receiving element of the disclosure further has an internal joint angle and an external joint angle with different degrees to ensure the supporting walls of the column may be bent from the exterior surface toward the interior surface or from the interior surface toward the exterior surface under various forces so as to increase sensing sensitivity and sensing accuracy of each strain sensor. More specifically, the ball screw of the disclosure includes temperature sensors and reference strain sensors disposed in low-strain regions that may directly measure the temperature variation of the ball screw so as to prevent temperature variation from affecting measurement accuracy of the preload so as to achieve the ball screw having composite functions such as screw nut tilt sensing capability and preload measurement capability.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A ball screw, comprising:
    a screw rod, wherein the screw rod has a first groove on an outer surface of the screw rod and is extended along a direction of an axis;
    two screw nuts, wherein each of the two screw nuts has a second groove on an inner surface of the screw nut, the two screw nuts are installed on the screw rod such that the two screw nuts can move along the axis;
    a channel formed by the first groove and the second groove,
    a plurality of balls disposed in the channel; and
    a tilt detector disposed between the two screw nuts to detect a tilt angle of the two screw nuts, comprising:
        a force-receiving element comprising:
            at least one ring-type structure having two planes, wherein a normal vector on a first sectional plane where the at least one ring-type structure is located is parallel to the direction of the axis, and the first sectional plane and the axis are intersected at a first intersection;
            at least one first strain sensor; and
            at least one second strain sensor,
        wherein the two planes are parallel to each other and the two planes are respectively in contact with the two screw nuts, the at least one ring-type structure is a point-symmetric with respect to the first intersection.

2. The ball screw of claim 1, wherein a normal vector on a second sectional plane where the at least one first strain sensor and the at least one second strain sensor are located is parallel to the direction of the axis, the second sectional plane and the axis are intersected at a second intersection, the at least one first strain sensor and the at least one second strain sensor are disposed on the at least one ring-type structure in a point-symmetric manner with respect to the second intersection.

3. The ball screw of claim 1, wherein the two planes are respectively pressed against the two screw nuts such that a preload is generated between the balls and the corresponding first groove and second groove.

4. The ball screw of claim 2, further comprising an application-specific integrated circuit chip, wherein when the force-receiving element is strained, the at least one first strain sensor generates a first electrical signal and the at least one second strain sensor generates a second electrical signal, and the application-specific integrated circuit chip calculates a difference between the first electrical signal and the second electrical signal.

5. The ball screw of claim 4, wherein when the application-specific integrated circuit chip determines an absolute value of the difference between the first electrical signal and the second electrical signal to be greater than a predetermined value, the application-specific integrated circuit chip generates a notification signal.

6. The ball screw of claim 4, wherein when the application-specific integrated circuit chip determines an absolute value of the difference between the first electrical signal and the second electrical signal to be less than a predetermined value, the application-specific integrated circuit chip records the first electrical signal and the second electrical signal.

7. The ball screw of claim 1, wherein the force-receiving element further comprises at least one first sensing unit and at least one second sensing unit, a normal vector on a third sectional plane where the at least one first sensing unit and the at least one second sensing unit are located is parallel to the direction of the axis, the third sectional plane and the axis are intersected at a third intersection, the at least one first sensing unit and the at least one second sensing unit are disposed in the at least one ring-type structure in a point-symmetric manner with respect to the third intersection, and a flexural rigidity of the at least one first sensing unit and a flexural rigidity of the at least one second sensing unit are respectively less than a flexural rigidity of the at least one ring-type structure.

8. The ball screw of claim 7, wherein the at least one first sensing unit further comprises at least one first cavity and at least one first column, the at least one second sensing unit further comprises at least one second cavity and at least one second column, two ends of the at least one first column are respectively connected to an upper surface and a lower surface of the at least one first cavity, two ends of the at least one second column are respectively connected to an upper surface and a lower surface of the at least one second cavity, the at least one first cavity and the at least one second cavity are disposed in the at least one ring-type structure in a point-symmetric manner with respect to the third intersection, and the at least one first column and the at least one second column are disposed in the at least one ring-type structure in a point-symmetric manner with respect to the third intersection.

9. The ball screw of claim 8, wherein the at least one first column further comprises a first hole, and the first hole is disposed in the at least one first column to form two first supporting walls for reducing a flexural rigidity of the at least one first column along the axis, and the at least one second column further comprises a second hole, and the second hole is disposed in the at least one second column to form two second supporting walls for reducing a flexural rigidity of the at least one second column along the axis.

10. The ball screw of claim 9, wherein the two first supporting walls respectively comprise at least one first exterior surface and at least one first interior surface, the at least one first exterior surface and the upper surface of the at least one first cavity or the lower surface of the at least one first cavity define a first external joint angle, the at least one first interior surface and the upper surface of the at least one first cavity or the lower surface of the at least one first cavity define a first internal joint angle, and the first internal joint angle is less than the first external joint angle.

11. The ball screw of claim 9, wherein each of the first supporting walls comprises at least one first exterior surface and at least one first interior surface, the at least one first exterior surface and the upper surface of the at least one first cavity or the lower surface of the at least one first cavity define a first external joint angle, the at least one first interior surface and the upper surface of the at least one first cavity or the lower surface of the at least one first cavity define a first internal joint angle, the first internal joint angle is greater than the first external joint angle.

12. The ball screw of claim 7, further comprising at least one temperature sensor and at least one reference strain sensor, wherein the at least one first strain sensor is disposed in a high-strain region of the first sensing unit, and the at least one temperature sensor and the at least one reference strain sensor are disposed in a low-strain region of the first sensing unit.

13. The ball screw of claim 12, wherein the at least one first strain sensor is disposed on at least one first column, and the at least one reference strain sensor and the at least one temperature sensor are disposed on an upper surface of at least one first cavity or a lower surface of the at least one first cavity.

14. A ball screw, comprising:
a screw rod, wherein the screw rod has a first groove on an outer surface of the screw rod and is extended along a direction of an axis;
two screw nuts, wherein each of the two screw nuts has a second groove on an inner surface of the two screw nuts, the two screw nuts are installed on the screw rod such that the two screw nuts can move along the axis;
a channel formed by the first groove and the second groove,
a plurality of balls disposed in the channel; and
a tilt detector disposed between the two screw nuts to detect a tilt angle of the two screw nuts, comprising:
a force-receiving element comprising:
at least one ring-type structure having two planes, wherein a normal vector on a first sectional plane where the at least one ring-type structure is located is parallel to the direction of the axis, and the first sectional plane and the axis are intersected at a first intersection;
at least one first strain sensor;
at least one second strain sensor;
at least one reference strain sensor; and
at least one temperature sensor;
wherein the two planes are parallel to each other and the two planes are respectively in contact with the two screw nuts, the at least one ring-type structure is a point-symmetric with respect to the first intersection, the at least one first strain sensor and the at least one second strain sensor are disposed in a high-strain region of the force-receiving element, and the at least one reference strain sensor and the at least one temperature sensor are disposed in a low-strain region of the force-receiving element.

15. The ball screw of claim 14, wherein a normal vector on a second sectional plane where the at least one first strain sensor and the at least one second strain sensor are located is parallel to the direction of the axis, the second sectional plane and the axis are intersected at a second intersection, the at least one first strain sensor and the at least one second strain sensor are disposed on the at least one ring-type structure in a point-symmetric manner with respect to the second intersection.

16. The ball screw of claim 14, wherein the two planes are respectively pressed against the two screw nuts such that a preload is generated between the balls and the corresponding first groove and second groove.

17. The ball screw of claim 14, further comprising an application-specific integrated circuit chip, wherein when the force-receiving element is strained, the at least one first strain sensor generates a first electrical signal and the at least one second strain sensor generates a second electrical signal, and the application-specific integrated circuit chip calculates a difference between the first electrical signal and the second electrical signal.

18. The ball screw of claim 17, wherein when the application-specific integrated circuit chip determines an absolute value of the difference between the first electrical signal and the second electrical signal to be greater than a predetermined value, the application-specific integrated circuit chip generates a notification signal.

19. The ball screw of claim 17, wherein when the application-specific integrated circuit chip determines an absolute value of the difference between the first electrical signal and the second electrical signal to be less than a predetermined value, the application-specific integrated circuit chip records the first electrical signal and the second electrical signal.

20. A ball screw, comprising:
a screw rod, wherein the screw rod has a first groove on an outer surface of the screw rod and is extended along a direction of an axis;
two screw nuts, wherein each of the two screw nuts has a second groove on an inner surface of the screw nut, the two screw nuts are installed on the screw rod such that the two screw nuts can move along the axis; and
a channel formed by the first groove and the second groove,
a plurality of balls disposed in the channel; and
a tilt detector disposed between the two screw nuts to detect a tilt angle of the two screw nuts, comprising:
a force-receiving element comprising:
at least one ring-type structure having two planes, wherein a normal vector on a first section plane where the at least one ring-type structure is located is parallel to the direction of the axis, and the first sectional plane and the axis are intersected at a first intersection;
at least one first sensing unit, comprising:
at least one first cavity;
at least one first column; and
at least one first hole;
at least one second sensing unit, comprising:
at least one second cavity;
at least one second column; and
at least one second hole;
at least one first strain sensor;
at least one second strain sensor;
at least one reference strain sensor; and
at least one temperature sensor,
wherein a normal vector on a third sectional plane where the at least one first sensing unit and the at least one second sensing unit are located is parallel to the direction of the axis, the third sectional plane and the axis are intersected at a third intersection, the two planes are parallel to each other and the two planes are respectively in contact with the two screw nuts, the at least one ring-type structure is a point-symmetric with respect to the first intersection, the at least one first sensing unit and the at least one second sensing unit are disposed in the at least one ring-type structure in a point-symmetric manner with respect to the third intersection, a flexural rigidity of the at least one first sensing unit and a flexural rigidity of the at least one second sensing unit are respectively less than a flexural rigidity of the at least one ring-type structure, two ends of the at least one first column are respectively connected to an upper surface and a lower surface of the at least one first cavity, the at least one first hole is disposed in the at least one first column to form two first supporting walls, each of the first supporting walls comprises at least one exterior surface and at least one interior surface, the at least one exterior surface and the upper surface of the at least one first cavity or the lower surface of the at least one first cavity define an external joint angle, the at least one interior surface and the upper surface of the at least one first cavity or the lower surface of the at least one first cavity define an internal joint angle, the internal joint angle is greater than the external joint angle, and the at least one reference strain sensor and the at least one temperature sensor are disposed on the upper surface of the at least one first cavity or the lower surface of the at least one first cavity.

21. The ball screw of claim 20, wherein a normal vector on a second sectional plane where the at least one first strain sensor and the at least one second strain sensor are located is parallel to the direction of the axis, the second sectional plane and the axis are intersected at a second intersection, the at least one first strain sensor and the at least one second strain sensor are disposed on the at least one ring-type structure in a point-symmetric manner with respect to the second intersection.

22. The ball screw of claim 20, wherein the at least one first cavity and the at least one second cavity are disposed in the at least one ring-type structure in a point-symmetric manner with respect to the third intersection, the at least one first column and the at least one second column are disposed in the at least one ring-type structure in a point-symmetric manner with respect to the third intersection, two ends of the at least one first column are respectively connected to an upper surface and a lower surface of the at least one first cavity, and two ends of the at least one second column are respectively connected to an upper surface and a lower surface of the at least one second cavity.

23. The ball screw of claim 20, wherein the two planes are respectively pressed against the two screw nuts such that a preload is generated between the balls and the corresponding first groove and second groove.

24. The ball screw of claim 20, further comprising an application-specific integrated circuit chip, wherein when the force-receiving element is strained, the at least one first strain sensor generates a first electrical signal and the at least one second strain sensor generates a second electrical signal, and the application-specific integrated circuit chip calculates a difference between the first electrical signal and the second electrical signal.

25. The ball screw of claim 24, wherein when the application-specific integrated circuit chip determines an absolute value of the difference between the first electrical signal and the second electrical signal to be greater than a predetermined value, the application-specific integrated circuit chip generates a notification signal.

26. The ball screw of claim 24, wherein when the application-specific integrated circuit chip determines an absolute value of the difference between the first electrical signal and the second electrical signal to be less than a predetermined value, the application-specific integrated circuit chip records the first electrical signal and the second electrical signal.

27. A ball screw, comprising:
a screw rod, wherein the screw rod has a first groove on an outer surface of the screw rod and is extended along a direction of an axis;
a first screw nut and a second screw nut, wherein each of the first screw nut and the second screw nut has an inner surface and a second groove on the inner surface, the first screw nut and the second screw nut are installed on the screw rod such that the first screw nut and the second screw nut can move along the axis; and
a channel formed by the first groove and the second groove;
a plurality of balls disposed in the channel; and
a tilt detector disposed between the first screw nut and the second screw nut to detect a tilt angle of the first screw nut relative to the second screw nut, and the tilt detector comprising a force-receiving element having two planes that are in contact with the first screw nut and the second screw nut to generate a preload between the balls and the corresponding first groove and the second groove.

28. The ball screw of claim 27, wherein
the two planes of the force-receiving element of the tilt detector are parallel to each other.

29. The ball screw of claim 28, wherein the force-receiving element further comprises at least one ring-type structure, a shape of the ring-type structure is an equilateral polygon.

30. The ball screw of claim 29, wherein the tilt detector further comprises
a plurality of strain sensors, at least one of the strain sensors is disposed on an outer lateral surface of each side of the ring-type structure.

* * * * *